US010296948B2

(12) United States Patent
Ramakrishnan et al.

(10) Patent No.: US 10,296,948 B2
(45) Date of Patent: May 21, 2019

(54) ONLINE DIGITAL CONTENT REAL-TIME UPDATE

(71) Applicant: Excalibur IP, LLC, New York, NY (US)

(72) Inventors: Eyal Arasu Ramakrishnan, Santa Clara, CA (US); Eran Shir, Ramat Hasharon (IL)

(73) Assignee: Excalibur IP, LLC, New York, NY (US)

( * ) Notice: Subject to any disclaimer, the term of this patent is extended or adjusted under 35 U.S.C. 154(b) by 425 days.

(21) Appl. No.: 13/844,439

(22) Filed: Mar. 15, 2013

(65) Prior Publication Data

US 2014/0279070 A1    Sep. 18, 2014

(51) Int. Cl.
*G06Q 30/02*    (2012.01)

(52) U.S. Cl.
CPC .................... *G06Q 30/0277* (2013.01)

(58) Field of Classification Search
CPC . G06Q 30/00; G06Q 30/0241; G06Q 30/0277
USPC ............................ 725/35; 705/14.13, 14.53
See application file for complete search history.

(56) References Cited

U.S. PATENT DOCUMENTS

| 9,009,064 B2* | 4/2015 | Karlin .................... G06Q 30/02 705/14.16 |
| 2006/0229938 A1 | 10/2006 | Yan |
| 2007/0233565 A1 | 10/2007 | Herzog et al. |
| 2008/0004990 A1 | 1/2008 | Flake |
| 2008/0320512 A1 | 12/2008 | Knight |
| 2009/0094073 A1 | 4/2009 | Cheung |
| 2010/0042421 A1 | 2/2010 | Bai |
| 2011/0251887 A1 | 10/2011 | Paul et al. |
| 2011/0251902 A1 | 10/2011 | Nagarajayya |
| 2012/0069131 A1 | 3/2012 | Abelow |
| 2013/0073388 A1* | 3/2013 | Heath .................... G06Q 50/01 705/14.53 |
| 2013/0124299 A1 | 5/2013 | Montgomery et al. |
| 2014/0108139 A1 | 4/2014 | Weinstein |
| 2014/0172547 A1 | 6/2014 | Subramanian |
| 2014/0181634 A1 | 6/2014 | Compain |
| 2014/0189733 A1* | 7/2014 | Anguiano ....................... 725/35 |

OTHER PUBLICATIONS

U.S. Appl. No. 13/844,518: Application filed Mar. 15, 2013, 70 pages.
U.S. Appl. No. 13/844,518: Filing Receipt, May 16, 2013, 3 pages.
U.S. Appl. No. 13/844,518: Notice of Publication, dated Sep. 18, 2014, 1 page.
U.S. Appl. No. 13/844,518: Non-Final Rejection, dated Jan. 2, 2015, 19 pages.
U.S. Appl. No. 13/844,518: Amendment/Req. Reconsideration-After Non-Final Reject., dated Apr. 3, 2015, 22 pages.
U.S. Appl. No. 13/844,518: Final Rejection, dated Jul. 30, 2015, 23 pages.

(Continued)

*Primary Examiner* — Marilyn G Macasiano
(74) *Attorney, Agent, or Firm* — Berkeley Law & Technology Group, LLP

(57) ABSTRACT

Briefly, embodiments disclosed herein may relate to online advertising and may relate, more particularly, to pushing advertising content to user computing devices, for example.

20 Claims, 10 Drawing Sheets

(56) References Cited

OTHER PUBLICATIONS

U.S. Appl. No. 13/844,518: Response After Final Acton, dated Oct. 30, 2015, 32 pages.
U.S. Appl. No. 13/844,518: Advisory Action, dated Nov. 6, 2015, 3 pages.
U.S. Appl. No. 13/844,518: RCE and Amendments, dated Jan. 7, 2016, 51 pages.
U.S. Appl. No. 13/844,518: Non-Final Rejection, dated Jun. 30, 2016, 32 pages.
U.S. Appl. No. 13/844,518: Amendment/Req. Reconsideration-After Non-Final Reject, dated Sep. 30, 2016, 44 pages.
U.S. Appl. No. 13/844,518: Final Rejection, dated Mar. 8, 2017, 29 pages.
U.S. Appl. No. 13/844,518: Response After Final Action, dated May 8, 2017, 24 pages.
U.S. Appl. No. 13/844,518: Advisory Action, dated Jun. 2, 2017, 4 pages.
U.S. Appl. No. 13/844,518: RCE and Amendments, dated Jul. 10, 2017, 25 pages.
U.S. Appl. No. 13/844,518: Non-Final Rejection, dated Jan. 9, 2018, 31 pages.
U.S. Appl. No. 13/844,518: Amendment/Req. Reconsideration-After Non-Final Rejection, dated Apr. 6, 2018, 26 pages.
U.S. Appl. No. 13/844,518: Final Rejection, dated Jul. 13, 2018, 33 pages.
U.S. Appl. No. 13/844,518: Response After Final Action, dated Sep. 13, 2018, 21 pages.
U.S. Appl. No. 13/844,518: Application Data Sheet to update/correct info, dated Sep. 13, 2018, 7 pages.
U.S. Appl. No. 13/844,518: After Final Consideration Program Request, dated Sep. 13, 2018, 2 pages.
U.S. Appl. No. 13/844,518: Advisory Action, dated Sep. 20, 2018, 4 pages.
U.S. Appl. No. 13/844,518: Pre-Exam Formalities Notice, dated Sep. 26, 2018.
U.S. Appl. No. 13/844,594: Application filed Mar. 15, 2013, 74 pages.
U.S. Appl. No. 13/844,594: Filing Receipt, dated Jun. 6, 2013, 3 pages.
U.S. Appl. No. 13/844,594: Notice of Publication, dated Sep. 18, 2014, 1 page.
U.S. Appl. No. 13/844,594: Non-Final Rejection, dated Nov. 3, 2014, 24 pages.
U.S. Appl. No. 13/844,594: Amendment/Req. Reconsideration-After Non-Final Rejection, dated Feb. 3, 2015, 21 pages.
U.S. Appl. No. 13/844,594: Final Rejection, dated May 27, 2015, 13 pages.
U.S. Appl. No. 13/844,594: After Final Consideration Program Decision, dated Sep. 14, 2015, 20 pages.
U.S. Appl. No. 13/844,594: Advisory Action, dated Sep. 14, 2015, 4 pages.
U.S. Appl. No. 13/844,594: RCE and Amendments, dated Sep. 28, 2015, 24 pages.
U.S. Appl. No. 13/844,594: Non-Final Rejection, dated Jun. 29, 2016, 13 pages.
U.S. Appl. No. 13/844,594: Amendment/Req. Reconsideration-After Non-Final Rejection, dated Sep. 29, 2016, 14 pages.
U.S. Appl. No. 13/844,594: Final Rejection, dated Dec. 28, 2016, 13 pages.
U.S. Appl. No. 13/844,594: Response After Final Action, dated Feb. 28, 2017, 21 pages.
U.S. Appl. No. 13/844,594: Advisory Action, dated Mar. 10, 2017, 4 pages.
U.S. Appl. No. 13/844,594: RCE and Amendments, dated Mar. 28, 2017, 25 pages.
U.S. Appl. No. 13/844,594: Non-Final Rejection, dated Dec. 27, 2017, 11 pages.
U.S. Appl. No. 13/844,594: Amendment/Req. Reconsideration-After Non-Final Rejection, dated Mar. 21, 2018, 24 pages.
U.S. Appl. No. 13/844,594: Application Data Sheet to update/correct info, dated Mar. 21, 2018.
U.S. Appl. No. 13/844,594: Filing Receipt, dated Mar. 28, 2018, 3 pages.
U.S. Appl. No. 13/844,594: Final Rejection, dated May 18, 2018, 14 pages.
U.S. Appl. No. 13/844,594: Response After Final Action, dated Jul. 11, 2018, 27 pages.
U.S. Appl. No. 13/844,594: Advisory Action, dated Jul. 26, 2018, 4 pages.
U.S. Appl. No. 13/844,594: RCE and Amendments, dated Aug. 20, 2018, 27 pages.

* cited by examiner

ONLINE DIGITAL CONTENT REAL-TIME UPDATE

BACKGROUND

Field

Subject matter disclosed herein may relate to online advertising and may relate, more particularly, pushing advertising content to user computing devices, for example.

Information

With networks such as the Internet gaining tremendous popularity and with the vast multitude of pages and/or other documents and/or other media content becoming available to users via the World Wide Web (web), for example, Web-based display advertising has increased in importance and prominence as industry seeks to take better advantage of the opportunities potentially afforded by these networks, including the Internet. In Web-based advertising systems, advertisements may be embedded in electronic documents, such as web pages, that may be presented to users, for example via web browser applications executed on any of a number of electronic device types. In such systems, significant challenges may be faced by advertisers and/or by advertisement platform developers in presenting particular advertisements and/or portions of advertisements to particular users or types of users, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
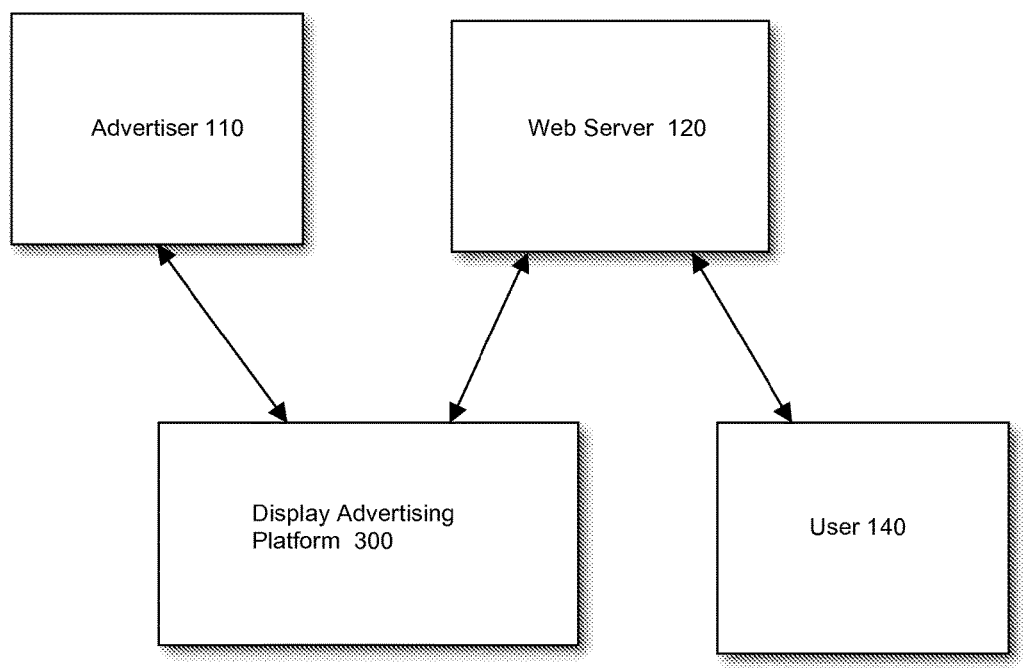
FIG. 1 is a schematic diagram illustrating an example system for pushing advertising content to a user computing device, according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term coupled may also be understood to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to devices communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc.

that may, for example, route a signal packet in accordance with a target address and availability of a network path of network nodes to a target address.

Physically connecting a network via a hardware bridge as one example may be done, although other approaches also exist. A hardware bridge, however, may not typically include a capability of interoperability via higher levels of a network protocol. A network protocol refers to a set of signaling conventions for communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance or substantial compatibility.

Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, a widely used part of the Internet may comprise the World Wide Web, often abbreviated "WWW" or simply referred to as just "the web". As mentioned, the terms Internet, web and/or similar terms may, therefore, be used interchangeably. The web, therefore, in this context, may comprise an Internet service that organizes stored content, such as, for example, text, images, video, etc., through the use of hypermedia. For example, a Hyper-Text Markup Language ("HTML") may be utilized to specify content and/or format of hypermedia type content, such as in the form of a file or an "electronic document," such as a web page, for example. An Extensible Markup Language (XML) may also be utilized to specify content and/or format of hypermedia type content, such as in the form of a file or an "electronic document," such as a web page, in an embodiment. Of course, HTML and XML are merely example languages provided as illustrations. Claimed subject matter is not intended to be limited to examples provided as illustrations, of course.

As used herein, a "web site" may refer to a collection of related web pages, in an embodiment. Also as used herein, "web page" may relate to any electronic file or electronic document, such as may be accessible via a network, by specifying a URL for accessibility via the web, in an example embodiment. As alluded to above, in one or more embodiments, a web page may comprise content coded using one or more languages, such as, for example, HTML and/or XML, although claimed subject matter is not limited in scope in this respect. Also, in one or more embodiments, application developers may write code in the form of JavaScript, for example, to provide content to populate one or more templates, such as for an application. However, JavaScript is merely an example programming language. As was mentioned, claimed subject matter is not limited to examples or illustrations.

As used herein, the term "entry", "electronic entry", "document", "electronic document" and/or similar terms are meant to refer to signals and/or states in a digital format that may be perceived by a user if displayed by a digital device, such as, for example, a computing device. For one or more embodiments, an electronic document may comprise a web page coded in a markup language, such as, for example, HTML (hypertext markup language). In another embodiment, an electronic document may comprise a portion or a region of a web page. However, claimed subject matter is not limited in these respects. Also, for one or more embodiments, an electronic document or electronic entry may comprise a number of components. Components in one or more embodiments may comprise text, for example as may be displayed on a web page. Also for one or more embodiments, the components may comprise a graphical object, such as, for example, a digital image, or sub-objects, such as attributes thereof.

As mentioned, with networks such as the Internet gaining tremendous popularity and with the vast multitude of pages and/or other documents and/or other media content becoming available to users via the World Wide Web (web), for example, Web-based display advertising has increased in importance and prominence as industry seeks to take better advantage of the opportunities potentially afforded by these networks, including the Internet. In Web-based advertising systems, advertisements, which may be referred to herein as an "ad" or one or more "ads", may be embedded in electronic documents, such as web pages, that may be presented to users, for example via web browser applications executed on any of a number of electronic device types. Such network-based advertising may be referred to as "display advertising." In such systems, significant challenges may be faced by advertisers and/or by advertisement platform developers in presenting particular advertisements and/or portions of advertisements to particular users or types of users, for example.

In one or more example embodiments of display advertising systems, ads may include text or graphical information such as logos, photographs, or other images, for example. Ads may provide links to other web sites so that if a user clicks on or otherwise selects an ad, the user may be directed to a web site associated with the ad, in an embodiment. Ads may further include any of a wide range of digital content types, including, but not limited to, text, static images, video, or audio elements, for example. However, these are merely examples of possible types of content in display advertisements, and claimed subject matter is not limited in scope in these respects.

As also mentioned above, it may be advantageous in some circumstances for an advertiser to present particular advertisements or portions of advertisements to particular users or types of users. For example, an advertiser may wish to target an ad at men in particular, and may therefore specify to a web page publisher to display the ad whenever particular web pages thought to be of interest to men are accessed. For example, an advertiser for shaving products may think it advantageous to target an ad at men, and may specify that the ad be displayed whenever a page related to "sports" is accessed. Similarly, for another example, an advertiser for cosmetics may think it advantageous to target a particular ad at women specifically, and may specify that the ad be displayed whenever a page related to women's clothing is accessed. Additionally, determinations regarding which ads to present to particular users may be based at least in part on personal characteristics and/or interests and/or activities for individual users, for example.

Conventional ad delivery systems may operate on what may be referred to as a "page fetch" model, wherein ads may be delivered to a user computing device along with web page content. For systems adhering to the page fetch model, ads that are delivered to a user computing device, for example, may not change once delivered. That is, once an ad is delivered to a user computing device, the ad may remain static for as long as the ad is presented to the user. However, to at least a significant degree, the Web may be shifting towards an overall model wherein content on a web page may become more personalized and dynamic. For example, millions of users may view a home page of a given web page publisher, and content for such an example home page may be personalized and/or customized for individual users to provide substantially unique experiences for individual users of the tens of millions of users. Additionally, web page content may be more dynamic, with web page content being altered and/or customized as a user views a web page in order to provide users with richer web page viewing experiences. A shift towards more dynamic and personalized web page viewing may provide an opportunity for advertisers and/or advertisement delivery system developers to provide more dynamic and personalized online advertising.

FIG. 1 is a block diagram of an example embodiment 100 of a display advertising system. Example embodiment 100 may comprise an example real-time push advertising system, and may comprise a user, such as user 140, an advertiser, such as advertiser 110, and an advertisement system, such as display advertising platform 300. In an embodiment, a display advertising platform, such as platform 300, may support many users simultaneously. For example, in an embodiment, tens of millions of users, or more, may be supported concurrently by a display advertising platform. In an embodiment, context may be monitored and tracked for individual users and ads.

For an embodiment, an advertiser, such as advertiser 110, may desire to place one or more ads on one or more web servers, such as web server 120, to be seen by users, such as user 140, that may access one or more web pages via one or more web servers, such as web server 120. In an embodiment, a display advertising platform, such as display advertisement platform 300, may receive contract requests from an advertiser, such as advertiser 110, and may determine whether adequate inventory exists to satisfy the contract. Also, in an embodiment, a price may be generated for the contract. For an embodiment, a contract request may specify one or more ads to be displayed, and may specify any of a range of conditions surrounding the displaying of the ad, including, but not limited to, the number of times the ad is to be displayed and the time period over which the ad is to be displayed. A contract request may also specify that an ad be displayed to particular types of users based, at least in part, on one or more demographic attributes, for example. A contract request may also specify types of information to be provided to an advertiser, such as advertiser 110, from a display advertisement platform, such as display advertisement platform 300, for example. Additionally, in an embodiment, an advertiser, such as advertiser 110, may specify modifications to one or more ads presented to one or more users, such as user 140, based at least in part on information provided to an advertiser, such as advertiser 110, from a display advertising platform, such as display advertising platform 300.

As mentioned, a shift towards more dynamic and personalized web page viewing may provide an opportunity for advertisers and/or advertisement delivery system developers to provide more dynamic and personalized online advertising. In an embodiment, advertisement content may be pushed to a user computing device substantially in real-time by a server computing device, such as web server 120 and/or display advertising platform 300, for example. Additionally, as discussed more fully below, information provided to advertisers by online advertisement systems and/or modifications to advertisements may occur in substantially real-time. Additionally, providing information to advertisers and/or making modifications to advertisements may occur in substantially real-time at least in part in response to detections of changes in online advertising context. As discussed more fully below, online advertising context may comprise web page context, user context, device context, and/or advertisement context, for example. As used herein, the term "real-time" as it relates to an action taken in response to a particular event refers to taking the action in response to the particular event without added delay. For example, transmitting advertisement performance data from a performance monitoring device to an advertiser in "real-time" refers to transmitting the performance data without delay as the data is gathered.

Figure 2:
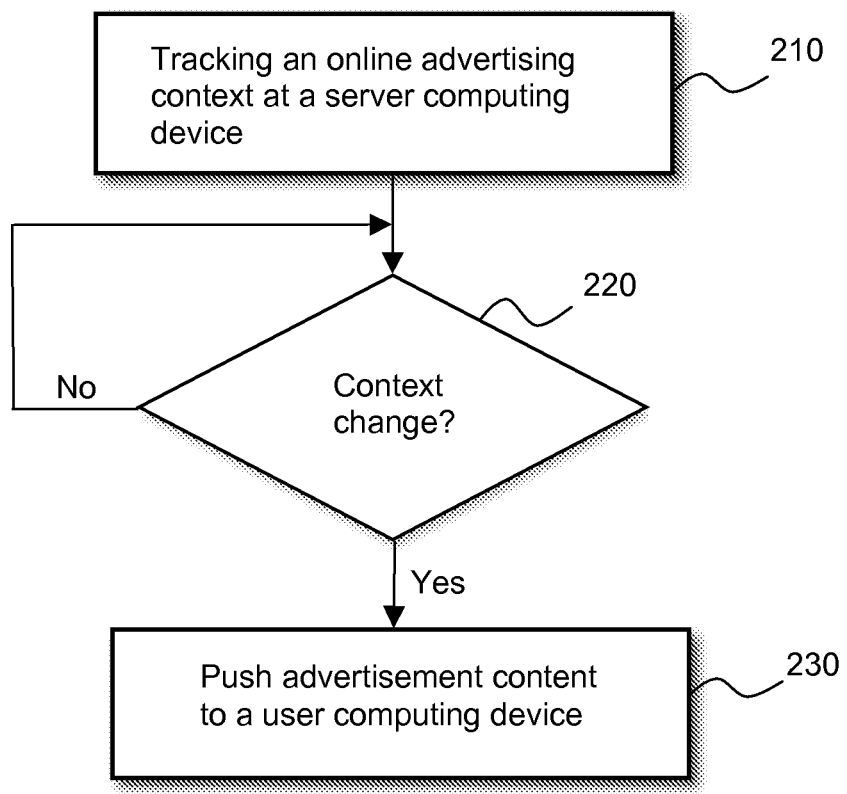
FIG. 2 is a flow diagram illustrating an example process for pushing advertising content to a user computing device in accordance with an embodiment.

FIG. 2 is a flow diagram illustrating an example process for pushing advertising content to a user computing device in accordance with an embodiment. At block 210, an online advertising context may be tracked at a server computing device. In an embodiment, online advertising context may comprise one or more attributes related to a web page, a user, and/or an advertisement, for example. In an embodiment, the term "user context" may refer to one or more attributes that may relate to an individual user. Examples of attributes that may relate to user context may include, but not limited to, demographic attributes including user ID, Internet Protocol (IP) address, name, gender, age and/or age ranges, country, state/province and/or city of residence, subject areas of interest to the user, income level, occupation, birth date, education level, language, etc.

Additionally, as used herein, the term "page context" refers to one or more attributes associated with an electronic document and its content. Also, as used herein, the term "page" may refer to electronic document contents viewed on a display by a user. Example page attributes related to page context may include domain, topic, tag, property, features list, web page from which the user navigated, and/or feature list from comments, to name but a few example. Of course, claimed subject matter is not limited in scope in these respects. Further, as used herein, the term "advertisement context" refers to one or more attributes related to an online advertisement. Example attributes related to advertisement context may include, for example, a campaign identifier, an advertisement identifier, information related to one or more products, one or more messages, and/or text related to the advertisement. Again, claimed subject matter is not limited in scope in these respects. Also, "device context" may relate to location of mobile phone, device type, device display type, and so on, for example. Changes in device context may include changes in location of a device such as a mobile phone, change of device type, such as a user switching from a mobile phone to a desktop device, for example, change in device display, such as changing from mobile display screen to television screen, to list but a few examples. Again, claimed subject matter is not limited in scope in these respects.

As depicted in FIG. 2, at block 220 a determination may be made as to whether a change in context has occurred. In an embodiment, a change of context may comprise a change in page context, a change in user context, and/or a change in advertisement context, or any combination of page, user, and/or advertisement contexts. In an embodiment, a real-time push advertisement may have a live context on an ad server, and the server may monitor the ad context to detect any change in ad context.

In an embodiment, an example context change may comprise a context change involving a page context. For example, a change in page context may comprise a change in page content and/or page layout, or may include user comments or feedback related to a page.

Also, in an embodiment, an example context change may comprise a context change involving a user context. For example, a change in user context may comprise a change in behavior, such as, for example, a user engaging in multi-screen viewing, or a user interacting with a particular product. Other examples may include a change in user demographic information, or a change in other targeting attributes. Example targeting attributes may include previous search queries or keywords, or may include information related to a user's interests. Of course, these are merely examples of attributes related to user context. Additionally, a change in user context may comprise a change in user geographical context, such as a change in location. For example, user context may change as a user moves from one location to another. For yet another example of a change in user context, a change in time may comprise a change in user context. For example, user context may be based, at least in part, on a time of day, such morning, afternoon, evening, and a change in time may signal a change in user context. Again, these are merely example of changes in user context, and claimed subject matter is not limited in scope in these respects.

In an embodiment, at least in part in response to a detection of a context change, a server computing device may push advertisement content to a user computing device, as depicted in FIG. 2 at block 230. For example, a server computing device may push a new advertisement to the client computing device in response to a change in context, in an embodiment. In another embodiment, advertisement content related to a different product for an existing advertisement may be pushed from the server to a client. For example, a client device may display a current advertisement including information related to a first product. For this example, the product may comprise a lunch menu for the user's preferred restaurant. Also, for this example, a change in context may occur in that a current time may change from afternoon to evening, for example. In response to the context change, a server may push a dinner menu for the user's preferred restaurant, and the user client device display may be updated to show the dinner menu instead of the lunch menu. During this activity, the user has taken no action. Rather, a change of context occurred, and in response a real-time update is pushed to the user's display. In this manner, the user's viewing experience is enhanced, and the restaurant, who is the advertiser for this example, receives increased benefit in that the advertisement is more likely to achieve a desirable result. Of course, claimed subject matter is not limited in scope to the specific examples described herein.

Embodiments in accordance with claimed subject matter may comprise all of blocks 210-230, or may comprise fewer than or more than blocks 210-230. Also, the order of blocks 210-230 is merely an example order, and claimed subject matter is not limited in scope in this respect.

Figure 3:
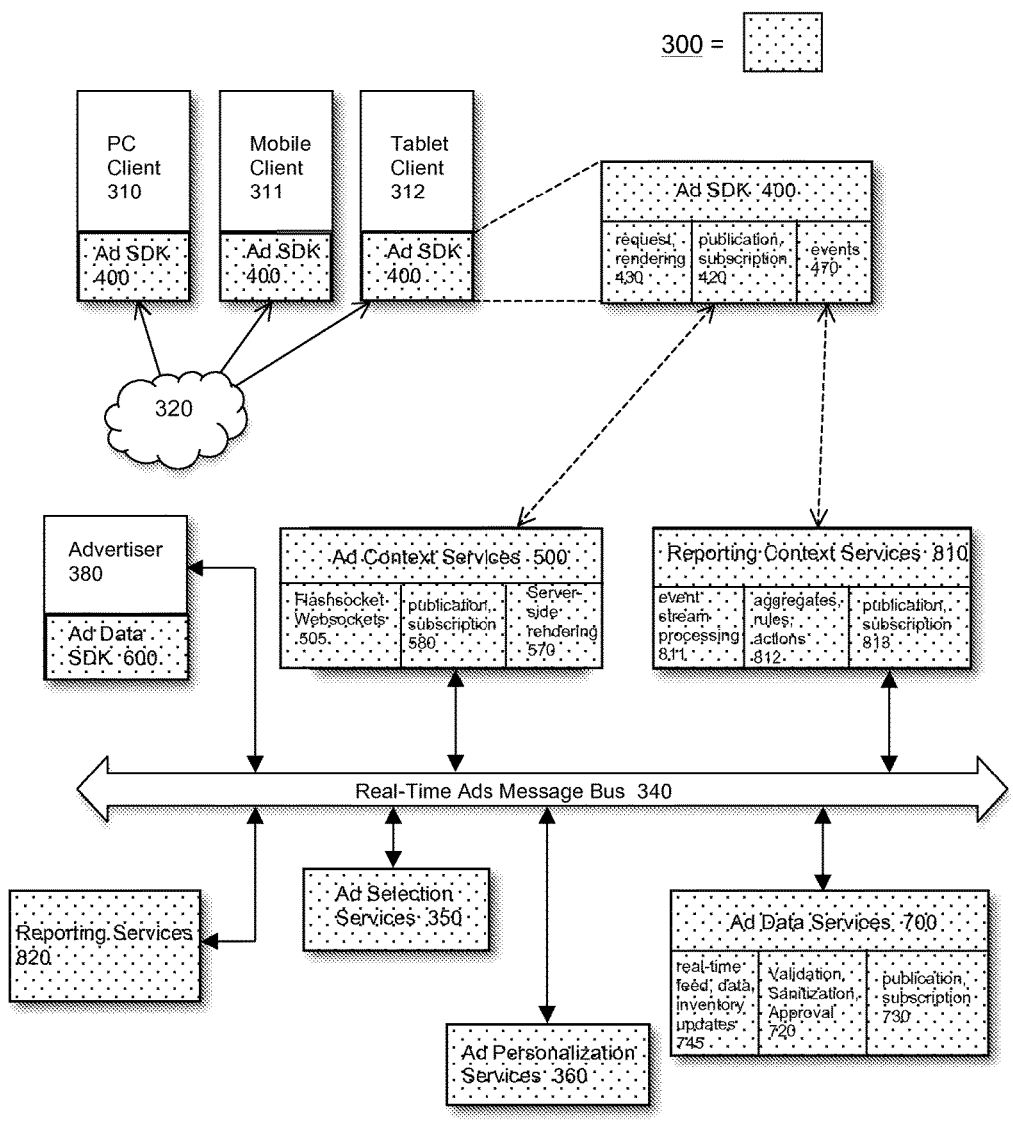
FIG. 3 is a schematic diagram illustrating an example online advertisement system in accordance with an embodiment.

FIG. 3 is a schematic diagram illustrating example embodiment 300 of a display advertising system. In an embodiment, display advertising platform 300 may implement real-time advertising design and/or updates. Various context information may be monitored, and advertisement content may be pushed to client devices, such as client devices 310, 311, and 312, at least in part in response to a detection of a change in context. In an embodiment, a communication network, such as network 320, may provide advertisement content to client devices, such as client devices 310, 311, and/or 312. In an embodiment, client computing devices may comprise any of a wide range of electronic device types. For example, client computing device 310 may comprise a personal computer. Client computing device 311 may comprise a mobile computing device, such as a cellular phone, for example. For another example, client computing device 312 may comprise a tablet computing device, in an embodiment. Of course, these are merely example client computing device types, and claimed subject matter is not limited in scope in these respects.

In an embodiment, client computing devices may comprise advertisement software development kits (ad SDK) 400, which may reside on client computing devices and provide communication between the client devices and display advertising system 300. For example, ad SDK 400 may comprise an events function 470 to communicate user activity and/or events to a reporting context service 810. A publication/subscription function 420 may enable a user to subscribe to one or more services and/or to specify customizations related to pushed advertisements, for example. Also, in an embodiment, ad SDK 400 may comprise a publication/subscription function to communicate with an ad context service 500, for example. Additionally, request rendering function 430 may receive communications from display advertising platform 300 components indicative of a request to have a client computing device update a current advertisement being displayed by the client device and/or to render a new advertisement, in an embodiment. An example embodiment 400 of ad SDK is explained more fully below in connection with FIG. 4.

Also, in an embodiment, ad context service 500 may reside on a server computing device, such as display advertising platform 300. In an embodiment, ad context service 500 may receive user, page, and/or advertisement context information, and may detect changes in context. Additionally, ad context service 500 may provide communications pathways between client devices 310, 311 and 312 and display computing platform 300 utilizing an example flash-socket, websockets function 505, for example. Further, ad context service 500 may comprise a publication/subscription function 580 that may, at least in part, manage publishing of updated messaging, text, etc. for current ads to ad SDK 400 residing on client devices 310, 311, and 312, for example. Ad context service 500 may also make calls to ad selection services 350 and/or to ad personalization services 360, in an embodiment, based at least in part on changes in context. An example embodiment 500 of an ad context service is described more fully below in connection with FIG. 5.

Also depicted in FIG. 3, display advertising platform 300 may further comprise an example Ad Data SDK 600 residing at an advertiser computing device 380. In an embodiment, ad data SDK 600 may receive reports in real-time from display advertising platform 300, for example, and may publish updates to advertisements to display advertising system 300. Ad data SDK 600 is discussed more fully below in connection with FIG. 6.

In an embodiment, display advertising platform 300 may comprise an Ad data service 700 that may receive updates from an advertiser, such as advertiser 380, and may validate and/or sanitize updates received from the advertiser. Ad data service 700 may also push updates received from advertiser 380 to clients 310, 311, and/or 312, for example. Ad data service 700 is discussed more fully below in connection with FIG. 7.

Display advertising platform 300 may also comprise a reporting context service 810 and a reporting service 820. As discussed more fully below, reporting service 820 may report information related to one or more current online advertisements to an advertiser, such as advertiser 380, for example. Reporting service 820 may also communicate with reporting context service 810, in an embodiment. Also, in an embodiment, display advertising platform 300 may comprise an ad selection services function 350 and an ad personalization services function 360.

As depicted in FIG. 3, display advertising platform 300 may comprise a real-time ads message bus 340. In an embodiment, various components of display advertising platform 300 may communicate via real-time ads message bus 340 to support real-time updates to current advertisements, for example. Through real-time ads message bus 340, advertisement content may be pushed to one or more of client devices 310, 311, or 312 substantially in real-time by display advertising platform 300, for example. Additionally, by way of real-time ads message bus 340, information provided to advertiser 380 may occur in substantially real-time.

Although an example embodiment 300 of display advertising platform is described herein as comprising specific functional units and/or components, such as ad SKD 400, ad context service 500, ad data service 700, ad data SDK 600, and real-time ads message bus 340, other embodiments may employ all of the functional units depicted in FIG. 3, fewer than the functional units depicted in FIG. 3, or more than the functional units depicted in FIG. 3. Additionally, the configuration of the various functional units depicted in FIG. 3 is merely an example configuration, and claimed subject matter is not limited in this respect.

Figure 4:
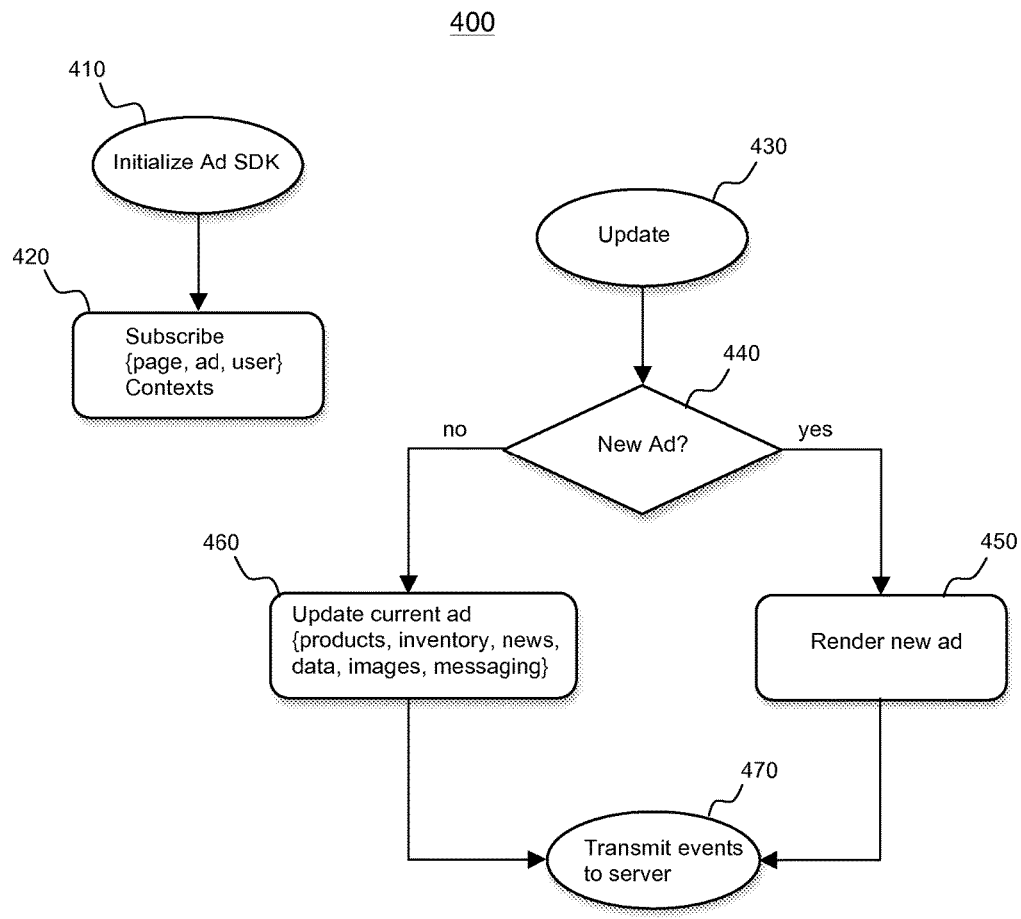
FIG. 4 is a schematic diagram illustrating an example process for updating an online advertisement at a client computing device according to an embodiment.

FIG. 4 is a schematic diagram illustrating an example process for updating an online advertisement at a client computing device, such as client computing device 310, according to an embodiment. As mentioned, client computing devices, such as client 310, may comprise advertisement software development kits (ad SDK) 400, which may provide communication between the client devices and display advertising system 300, in an embodiment. As depicted in FIG. 4, ad SDK may be initialized at block 410. In an embodiment, ad SDK 400 may comprise a subscription component, as indicated at block 420. The subscription component indicated at block 420 may correspond to publication/subscription function 420 depicted in FIG. 4, for example. At block 420, for example, client computing device 310 may subscribe to one or more services and/or may specify customizations related to pushed advertisements, for example.

In an embodiment, ad SDK 400 may enable a client computing device, such as client 310, for example, to receive information to update a current advertisement, and may also provide functionality to perform the update. For example, at block 430, client 310, for example, may receive information indicative of an advertisement update. In an embodiment, block 430 may correspond to request rendering function 430 depicted in FIG. 4. At block 440, a determination may be made as to whether or not information received at block 430 comprises a new advertisement. In an embodiment, if a determination is made at block 440 that information received at block 430 comprises a new advertisement, the new advertisement may be rendered by client computing device 310 at block 450.

However, if a determination is made at block 440 that information received at block 430 does not comprise a new advertisement, a current advertisement may be updated at block 460 using information received at block 430. For example, an advertisement may be updated with new or different product information, or an advertisement may display inventory information for a particular product, and the inventory information may change over time. In an embodiment, a change in inventory information may comprise a context change, and a context change in this manner may trigger a real-time update to the current advertisement. As further depicted at block 460, other example types of information that may be updated within a current advertisement may include news, data, images, and/or messaging. With respect to messaging, an advertiser may desire to change one or more messages presented in an advertisement. For example, an advertiser might receive information from display advertising platform 300 indicating various performance parameters related to a current advertisement, and the advertiser may desire to make adjustments to messaging in the advertisement. An advertiser, such as advertiser 380, may transmit a request to update a current advertisement, and such a request may be received by a client device, such as client 310, as indicated at block 430 depicted in FIG. 4. In an embodiment, an advertiser may receive performance information, may make a determination to update an advertisement based on the performance information, and may transmit a request to have the advertisement updated all in real-time. Further, a client computing device, such as client 310, may update the current advertisement at least in part through functionality provided by ad SDK 400, also in real-time.

At block 470, an events message may be transmitted to a server computing device, for example to reporting context service 810 of display advertising platform 300. As mentioned in connection with FIG. 4, ad SDK 400 may comprise an events function 470 to communicate user activity and/or events, and for the present example embodiment, function 470 depicted in FIG. 3 corresponds to block 470 depicted in FIG. 4. In an embodiment, ad SDK 400 may indicate through an events message that the new ad has been rendered or that a current advertisement has been updated, as appropriate. Embodiments in accordance with claimed subject matter may include all, few than, or more than blocks 410-470. Additionally, the order of blocks 410-470 is merely an example order, and claimed subject matter is not limited in scope in this respect.

Figure 5:
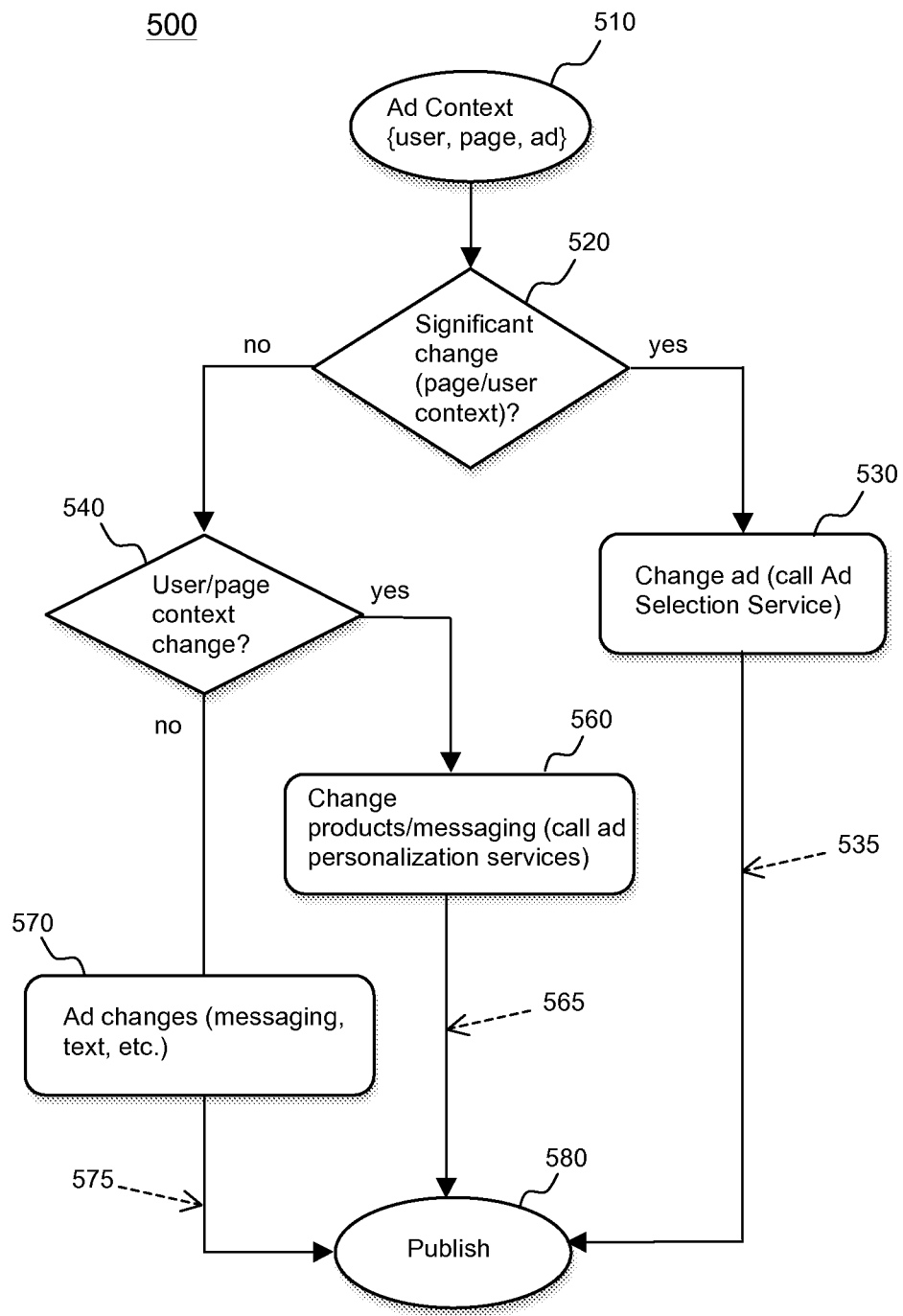
FIG. 5 is a schematic diagram illustrating an example process for detecting a change in context according to an embodiment.

FIG. 5 is a schematic diagram illustrating an example process for detecting a change in context according to an embodiment. As mentioned, ad context service 500 may reside on a server computing device, such as display advertising platform 300. In an embodiment, ad context service 500 may maintain all running contexts for display advertising platform 300. For example, in response to a page being loaded into a browser on a client computing device, as ad SDK may be initialized, such as depicted at block 410 of FIG. 4, and a context may be opened and initialized, for example as depicted at block 510.

In an embodiment, ad context services 500 may detect changes in context. For example, ad context services 500 may detect changes to user context, page context, and/or advertisement context. As depicted in FIG. 5, ad context services 500 may determine whether a significant change in context has occurred, as depicted at block 520, for example. In some situations, a significant change in context may comprise changes in user and/or page contexts, although claimed subject matter is not limited in scope in this respect. Further, as depicted in FIG. 5, at least in part in response to a determination that a significant change in context has occurred, ad context services 500 may determine at block 530 to change an advertisement based on the significant change in context. In an embodiment, ad context services 500 may call ad selection services 350, and may transmit information 535 indicating a request for a new ad, as indicated at block 580.

Additionally, in an embodiment, a determination may be made at block 520 that there is no significant change in context, and at block 540 a determination may be made as to whether a change in context includes a change in user context and/or a change in page context. If a determination is made at block 540 that a change in user context or a change in page context has occurred, a call may be made at block 560 to ad personalization services 560 to update a current advertisement. In an embodiment, an updated to a current advertisement may include a change in a particular product being advertised, and/or may include a change in messaging related to a product, for example. As depicted in FIG. 5, advertisement update information 565 may be published, or transmitted, to ad personalization services at block 580.

Further, at least in part in response to a determination that a change in context does not include a change in user and/or page context, ad context services 500 may implement changes to a current advertisement's messaging, text, etc., as depicted at block 570. In an embodiment, ad context services 500 may publish ad messaging update information 575 as indicated at block 580. In an embodiment, ad context services 500 may publish ad update information 565, ad messaging update information 575, and/or new ad information 535 via a real-time ad message bus, such as bus 340, for example. Embodiments in accordance with claimed subject matter may include all, few than, or more than blocks 510-580. Additionally, the order of blocks 510-580 is merely an example order, and claimed subject matter is not limited in scope in this respect.

Figure 6:
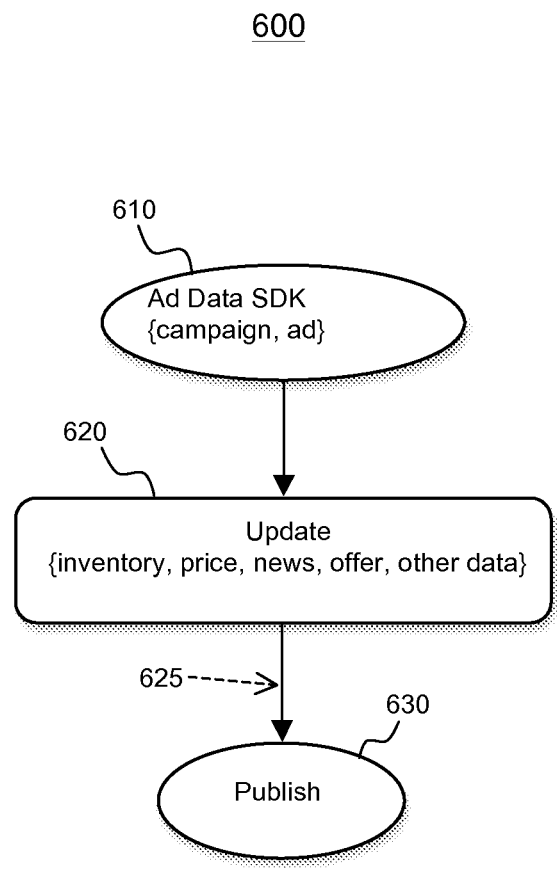
FIG. 6 is a schematic diagram illustrating an example process for updating an online advertisement at an advertiser computing device according to an embodiment.

FIG. 6 is a schematic diagram illustrating an example process for updating an online advertisement at an advertiser computing device, such as advertiser 380, according to an embodiment. As mentioned, and as depicted in FIG. 3, display advertising platform 300 may comprise example ad data SDK 600 residing at advertiser computing device 380. In an embodiment, ad data SDK 600 may receive reports in real-time from display advertising platform 300, for example, and may publish updates to advertisements to display advertising system 300. As indicated at block 610, for example, an advertiser, such as advertiser 380, may, by way of ad data SDK 600, maintain information related to one or more advertisements. Advertisement information may be indexed according to campaign ID, and/or an ad ID, for example. Also, as indicated at block 620, an advertiser, such as advertiser 380, may update components of a current application. Example types of ad components that may be updated by an advertiser include inventory information, price information, news, offers, and/or other data, although claimed subject matter is not limited in scope in these respects.

In an embodiment, an advertiser, such as advertiser 380, may publish ad update information 625, as indicated at block 630. Also, in an embodiment, ad update information 625 may be published via real-time ad message bus 340. As discussed below, an advertiser, such as advertiser 380, may publish ad update information, and that ad update information may be received at ad data services 700, in an embodiment. Embodiments in accordance with claimed subject matter may include all, few than, or more than blocks 610-630. Additionally, the order of blocks 610-630 is merely an example order, and claimed subject matter is not limited in scope in this respect.

Figure 7:
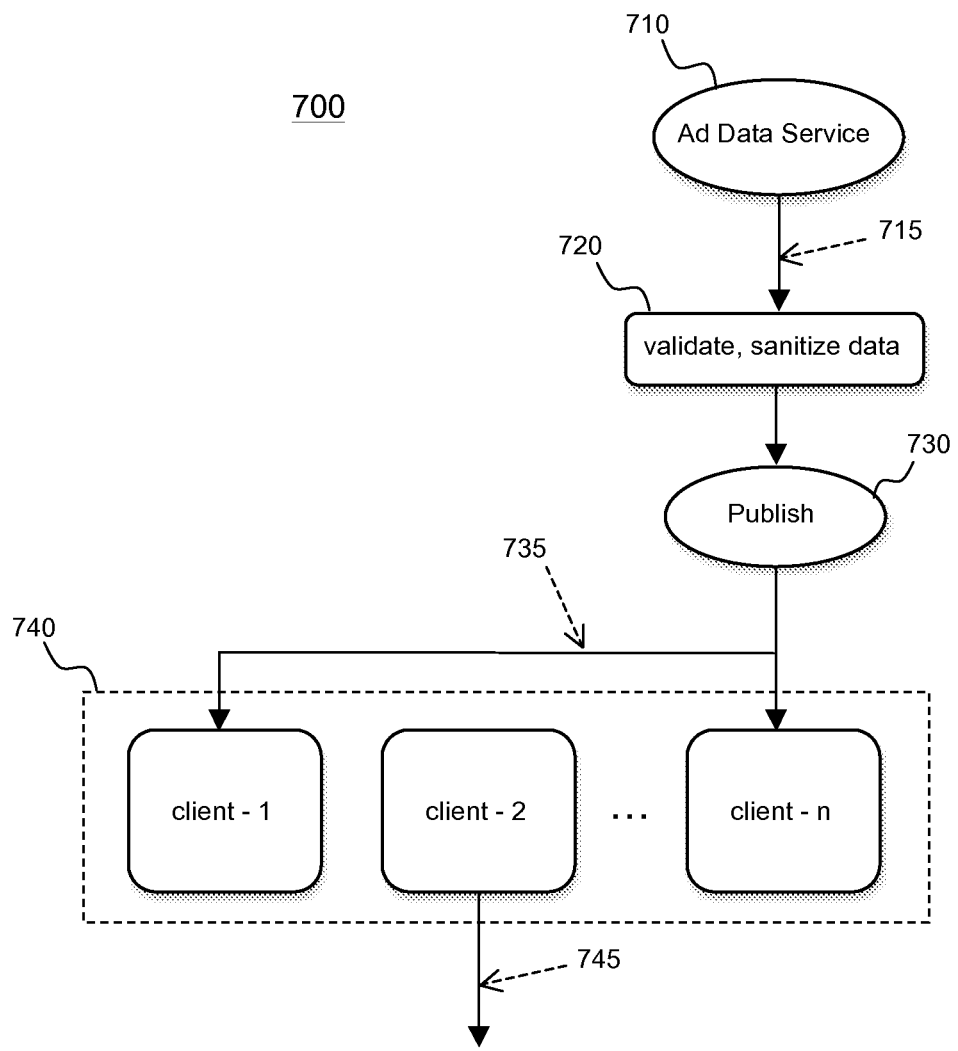
FIG. 7 is a schematic diagram illustrating an example process for validating an update to an online advertisement according to an embodiment.

FIG. 7 is a schematic diagram illustrating an example process for validating an update to an online advertisement according to an embodiment. In an embodiment, display advertising platform 300 may comprise ad data service 700 that may receive updates from an advertiser, such as advertiser 380, and may validate and/or sanitize updates received from the advertiser. For example, at block 710, ad data services may receive ad update information 715 from an advertiser, such as advertiser 380. As indicated at block 720, ad update information received from advertiser 380 may be analyzed and validated and/or sanitized. Further, as indicated at block 730, validated and/or sanitized ad update information that originated at advertiser 380 may be published. In an embodiment, ad update information 735 may be pushed real-time to one or more client computing devices, as indicated at block 740. Additionally, in an embodiment, one or more client computing devices may transmit rendering status information 745 to one or more recipients, including, in an embodiment, an advertiser, such as advertiser 380, for example.

As noted from the example advertisement update process described above in connection with FIGS. 6 and 7, advertisers may push changes to an advertisement at any time, including while an ad is being displayed at a client computing device. In some embodiments, advertisers may update an ad in real-time in response to receiving real-time performance information related to an ad. In conventional online advertising systems, once an ad is deployed to a client computing device, an advertiser has no opportunity to make adjustments or changes to the ad. Embodiments described herein may provide advantages to advertisers who may now be able to make adjustments to advertisements in real-time as performance feedback is received. Embodiments in accordance with claimed subject matter may include all, few than, or more than blocks 710-740. Additionally, the order of blocks 710-740 is merely an example order, and claimed subject matter is not limited in scope in this respect.

Figure 8:
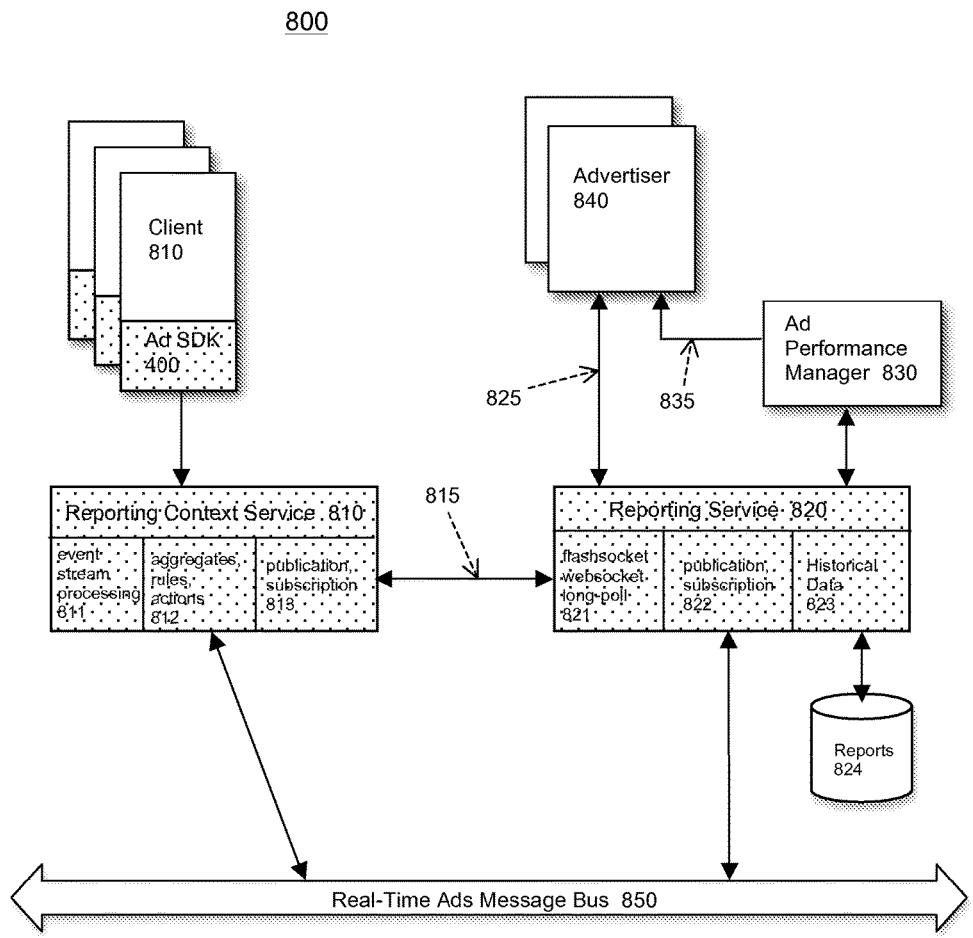
FIG. 8 is a schematic diagram illustrating an example system for monitoring and/or managing advertisement performance in accordance with an embodiment.

FIG. 8 is a schematic diagram illustrating an example embodiment 800 of a system for monitoring and/or managing advertisement performance in accordance with an embodiment. In an embodiment, system 800 may comprise one or more client computing devices 810, individually comprising ad SDK 400, as described above. Also, in an embodiment, system 800 may comprise an advertiser computing device 840 in communication with an ad performance manager 830 and reporting services 820. In an embodiment, reporting services 820 may comprise flashsocket, websocket, and/or long-polling communications functions 821, for example, and may also comprise a publication/subscription interface 822 to a real-time ads message bus 850. Also, in an embodiment, reporting services 820 may comprise a historical data function 823, and a reports database 824.

Also included in example system 800 is reporting context services function 810, mentioned previously in connection with FIG. 3. In an embodiment, reporting context services 810 may comprise an event stream processing function 811, an aggregates, rules, actions function 812, and a publication/subscription function 813. Of course, claimed subject matter is not limited in scope in these respects.

In an embodiment, ad performance may be monitored and/or managed, and mentioned. Also, in an embodiment, ad performance data may be received by an advertiser, such as advertiser 850, in substantially real-time. For conventional online advertising systems, information regarding online advertisement performance may be gathered by an advertising system, and information may be processed in batches. Batched information may be provided to advertisers, and advertisers may analyze the information to try to determine various aspects of performance for online ads. However, for conventional online advertising systems, a significant period of time may elapse between display of an advertisement and the information related to that advertisement view being made available to the advertiser. For example, in some conventional systems, approximately 40 minutes may elapse before an advertiser receives information that may allow the advertiser to analyze ad performance.

In one or more embodiments in accordance with claimed subject matter, information related to advertisement performance may be provided to an advertiser in real-time, or in substantially real-time. For example, information related to ad performance may be transmitted from ad performance manager to an advertiser, for example, within one minute of the information being gathered, in an embodiment. By providing advertisers with information in real-time, the advertiser may be able to make decisions and/or to take actions that may lead to greater performance and/or enhanced user viewing experience.

In an embodiment, one or more client computing devices, such as client 810, may display one or more advertisements. Information related to the display of advertisements by clients 810 may be monitored by reporting context services 810, for example. As mentioned, reporting context services may track events related to client devices 810. Events that may be tracked may include, for example, pages visited, interactions with pages, and/or clicks, to name but a few examples. Also, in an embodiment, reporting context services 810 may provide aggregated information from any number of users, and may also provide segmented information. Aggregated information segmented according to ad, or by geography, or by any other attribute may be provided by reporting context services 810. In an embodiment, reporting context services 810 may publish information in substantially real-time via real-time ads message bus 850, in an embodiment. Additionally, in an embodiment, reporting services 820 may maintain reports 824 comprising information received via real-time ads message bus, for example. In an embodiment, reporting services 820 and reporting context service 810 may communicate rules and actions 815.

In an embodiment, advertiser 840 may receive a subset of all information gathered by reporting service 820. For example, reporting services 820 may provide live data aggregates 825 to advertiser 820. Ad performance manager 830, in an embodiment, may access all information in real-time, and may provide recommendations 835 to advertiser 840.

In an embodiment, advertisers, such as advertiser 840, may be provided what may be referred to as a "dashboard". In an embodiment, a dashboard may be provided to advertisers via ad data SDK 600, as depicted in FIG. 3, for example. In an embodiment, a dashboard may comprise a software agent to be executed by an advertiser computing device, such as advertiser 840, for example. Also, in an embodiment, a dashboard may be provided to an advertiser by a display advertising platform, for example. In an embodiment, a dashboard may be referred to as a "live" dashboard to reflect that information is being made available in real-time, and to reflect the real-time nature of any adjustments or changes to any advertisements that an advertiser may specify in response to receiving real-time performance data. In an embodiment, a dashboard may allow a user at an advertiser to specify sets of data to analyze. For example, a user may specify that data be sliced based on specified geographic parameters, and/or based on targeting parameters related to a particular ad campaign, to name but a couple of examples. In an embodiment, a dashboard may provide shortcuts to performance information, such as information related to which segments are performing better, or which geographical are is performing better, or which products are performing better, although of course claimed subject matter is not limited in scope in these respects.

In an embodiment, an advertiser may request, for example, to see information related to how a particular ad is performing with a particular subset of users within a specified geographical area and/or within a time period. For example, an advertiser may desire to understand how a particular ad campaign is performing among women in the San Francisco Bay Area. The advertiser may desire to know how many women, for example, are currently geographically located near a particular retail establishment, or how many San Francisco Bay Area women are currently browsing pages featuring a particular product. In response to such requests from the advertiser, a display advertising platform, such as platform 800, may provide the requested information in real-time. This is in contrast to situations for conventional online advertising systems, wherein an advertiser may need to wait for significant periods of time for such data to be gathered, batched, and analyzed.

In an embodiment, in response to receiving advertisement performance information in real-time, an advertiser may desire to make adjustments to an ad campaign to take advantage of whatever situation is revealed by the performance data. For example, if the advertiser in our current example discovers in the performance data that relatively high numbers of consumers, such as the San Francisco Bay Area women mentioned in the example above, are currently browsing pages that feature a particular product, but the advertiser also notices in this example that relatively few consumers are following through with a purchase. In such an example situation, an advertiser may specify, in real-time, that an online advertisement be updated with a new, lower price, and the advertiser may specify that women users in the San Francisco Bay Area be targeted with this updated add. In an embodiment, a display advertising system, such as system 800, may perform the update as specified by the advertiser, and performance of the advertisement following the update may also take place. Of course, this is merely an example of the types of real-time communication between an example embodiment of a display advertising system and an advertiser, and claimed subject matter is not limited in these respects. Also, these are merely examples of the types of information that may be made available to an advertiser via a dashboard, and claimed subject matter is not limited in scope in these respects.

As mentioned previously, a shift towards more dynamic and personalized web page viewing may provide an opportunity for advertisers and/or advertisement delivery system developers to provide more dynamic and personalized online advertising. For example, with the time spent on a page increasing, the "liveliness" of an ad on a page may become more relevant for business seeking to advertise their products and/or services via online advertisements. To provide more lively online ad content, advertisers may push real-time updates to client computing devices in order to dynamically change an ad. For example, consider a travel ad. An ad may be updated to reflect in real time the number of seats available on a particular airline flight, for example. In an embodiment, if the number of seats available changes while a user is viewing an ad, reducing the available inventory of available seats, the advertisement may be updated in real-time to reflect the reduced inventory. An advertiser may elect to adjust prices, for example, in reacting to a reduction in inventory, or to entice a user to purchase tickets. In this manner, an advertiser may perform real-time updates to online advertisements in an effort to increase the odds of a successful transaction with the user, for example.

Another example of dynamically updating an online ad may comprise an advertisement that includes a sports score, for example, that may change over the course of a game and/or match. For example, an advertisement for basketball shoes may incorporate a logo and colors, for example, from a user's favorite team. An ad may also include the score from a current game, and updates may be performed to keep the advertisement up-to-date with the game in progress.

Figure 9:
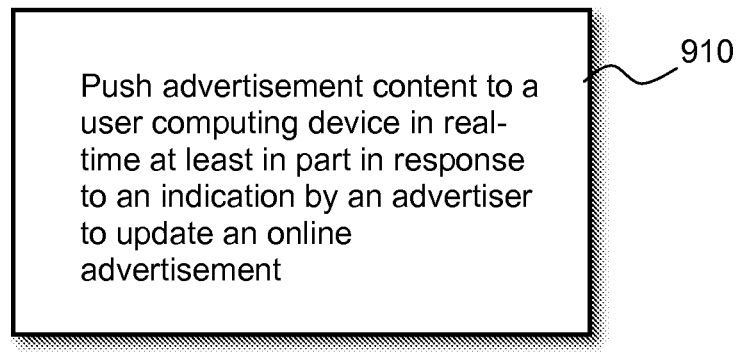
FIG. 9 is a flow diagram depicting an example process for pushing live data to one or more online advertisements.

FIG. 9 is a flow diagram depicting an example process for pushing live data to one or more online advertisements. At block 910, advertisement content may be pushed to a user computing device in real-time at least in part in response to an indication by an advertiser to update an online advertisement. In an embodiment, pushing the advertisement content to the user computing device may comprise pushing the advertisement content from a server computing device to the user computing device. Also, pushing the advertisement content to the user computing device may include pushing the advertisement content from an advertiser computing device to the user computing device. In an embodiment, pushing the advertisement content from the advertiser computing device to the user computing device may include providing the advertisement content to a server computing device to validate the advertisement content. Further, in an embodiment, the indication by the advertiser may represent a determination by the advertiser to update the online advertisement based at least in part on performance data related to the online advertisement. Also, the indication by the advertiser may comprise a specification of the advertisement content to be pushed to the user computing device, and the advertisement content may comprise updated data for a dynamically changing online advertisement component. Of course, this is merely an example of pushing advertisement content to a user computing device, and claimed subject matter is not limited in these respects.

Figure 10:
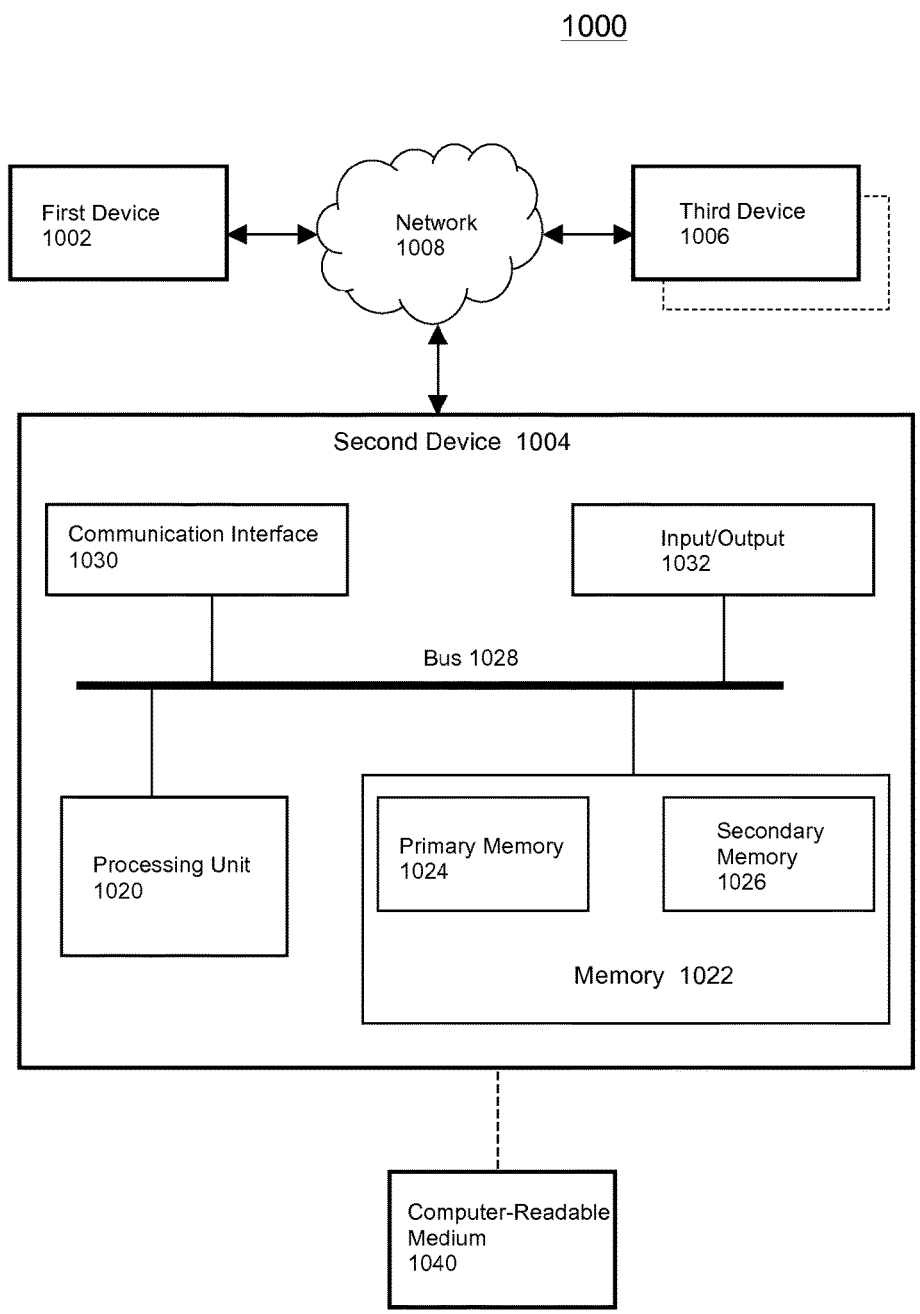
FIG. 10 is a schematic diagram illustrating an example computing device in accordance with an embodiment.

FIG. 10 is a block diagram illustrating an example system comprising a plurality of computing devices coupled via a network in accordance with an embodiment. For purposes of illustration, FIG. 10 is an illustration of an embodiment of a computing platform or computing device 1004 that may be employed in a client-server type interaction, such as described infra. In FIG. 10, computing device 1004, which may comprise features of a server computing device, may interface with a computing device 1002, which may comprise features of a client device, for example. In other embodiments, computing device 1004 may comprise a client computing device, and computing device 1002 may comprise a server computing device, for example. In an embodiment, communications interface 1030, processor (e.g., processing unit) 1020, and memory 1022, which may comprise primary memory 1024 and secondary memory 1026, may communicate by way of communication bus 1028, for example. In FIG. 10, computing device 1004 may store various forms of content, such as analog, uncompressed digital, lossless compressed digital, or lossy compressed digital formats for content of various types, such as video, imaging, text, audio, etc. in the form physical states or signals, for example. Computing device 1004 may communicate with computing device 1002 and/or with computing device 1006 by way of an Internet connection via network 1008, for example. Although the computing device 1004 of FIG. 10 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 1020 may be representative of one or more circuits, such as digital circuits, to perform at least a portion of a computing procedure or process. By way of example but not limitation, processor 1020 may comprise one or more processors, such as controllers, microprocessors, microcontrollers, application specific integrated circuits, digital signal processors, programmable logic devices, field programmable gate arrays, and the like, or any combination thereof. In implementations, processor 1020 may perform signal processing to manipulate signals or states or to construct signals or states, for example.

Memory 1022 may be representative of any storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, or one or more data storage devices or systems, such as, for example, a disk drive, an optical disc drive, a tape drive, a solid-state memory drive, just to name a few examples. Memory 1022 may be utilized to store a program, as an example. Memory 1022 may also comprise a memory controller for accessing computer readable-medium 1040 that may carry and/or make accessible content, code, and/or instructions, for example, executable by processor 1020 or some other controller or processor capable of executing instructions, for example. Also, in an embodiment, memory 1022 may store a local database cache, for example.

Under the direction of processor 1020, memory, such as cells storing physical states, representing for example, a program, may be executed by processor 1020 and generated signals may be transmitted via the Internet, for example. Processor 1020 may also receive digitally-encoded signals from server 1004.

Network 1008 may comprise one or more communication links, processes, and/or resources to support exchanging communication signals between a client and server, which may, for example, comprise one or more servers (not shown). By way of example, but not limitation, network 1008 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing device," as used herein, refers to a system and/or a device, such as a computer, that includes a capability to process and/or store data in the form of signals and/or states. Thus, a computing device, in this context, may comprise hardware, software, firmware, or any combination thereof (other than software per se). Computing device 1004, as depicted in FIG. 10, is merely one such example, and the scope of claimed subject matter is not limited to this particular example. For one or more embodiments, a computing device may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 1022 may store cookies relating to one or more users and may also comprise a computer-readable medium that may carry and/or make accessible content, code and/or instructions, for example, executable by processor 1020 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method of executing computer instructions on at least one computing device without further human interaction in which the at least one computing device includes at least one processor and at least one memory, comprising:

fetching computer instructions from the at least one memory of the at least one computing device for execution on the at least one processor of the at least one computing device;

executing the fetched computer instructions on the at least one processor of the at least one computing device; and storing in the at least one memory of the at least one computing device any results of having executed the fetched computer instructions on the at least one processor of the at least one computing device;

wherein the computer instructions to be executed comprise instructions for dynamically updating particular online digital content currently displayed on at least one particular user computing device;

wherein the executing the fetched instructions further comprises:

processing, via the at least one processor of the at least one computing device, one or more values to generate a first representation of one or more particular performance parameters for the particular online digital content currently displayed on the at least one particular user computing device;

converting the first representation into a second representation comprising a change in the one or more particular performance parameters;

detecting, from the second representation, the change in the one or more particular performance parameters; and pushing, at least in part via execution of a publication and/or subscription service of the at least one computing device, particular updated digital content for the particular online digital content currently displayed on the at least one particular user computing device from the at least one computing device to the at least one particular user computing device in substantially real-time at least in part in response to obtaining one or more signals and/or states comprising an indication to dynamically update the particular online digital content currently displayed on the at least one particular user computing device based at least in part on the detected change in the one or more particular performance parameters at least in part in accordance with one or more services or customizations, or a combination thereof, specified by a subscription component of the at least one user computing device.

2. The method of claim 1, wherein the pushing the particular updated digital content to the at least one particular user computing device comprises communicating one or more signals comprising the particular updated digital content between a communication interface of the at least one computing device and the at least one particular user computing device at least in part in response to an online digital context service obtaining, from an online digital content selection service of the at least one computing device, the one or more signals and/or states comprising the indication to update the particular online digital content currently displayed on the at least one particular user computing device.

3. The method of claim 1, wherein the pushing the particular updated digital content to the at least one particular user computing device comprises an online digital content context service of the at least one computing device pushing the particular updated digital content obtained from at least one online digital content provider computing device to the at least one particular user computing device.

4. The method of claim 3, wherein the pushing the updated digital content obtained from the at least one online digital content provider computing device to the at least one particular user computing device further comprises the at least one computing device validating the particular updated digital content.

5. The method of claim 1, wherein the indication to dynamically update the particular online digital content currently displayed on the at least one particular user computing device represents a determination by an advertiser to dynamically update the particular online digital content currently displayed on the at least one particular user computing device based at least in part on aggregated or segmented, or a combination thereof, digital online content performance content obtained from a plurality of user computing devices.

6. The method of claim 1, wherein the indication to dynamically update the particular online digital content currently displayed on the at least one particular user computing device comprises a specification of the particular updated digital content to be pushed to the at least one particular user computing device.

7. The method of claim 6, wherein the particular updated digital content comprises updated content for a dynamically changing component of the particular digital online content currently displayed on the at least one particular user computing device.

8. An apparatus, comprising: at least one computing device;

the at least one computing device to include at least one processor and at least one memory;

the at least one computing device to execute computer instructions on at least one processor without further human interaction;

the computer instructions to be executed to have been fetched from the at least one memory for execution on the at least one processor, and the at least one computing device to store in the at least one memory of the at least one computing device any results to be generated from the execution on the at least one processor of the to be executed computer instructions; and the computer instructions to be executed to comprise instructions to dynamically update particular online digital content to be currently displayed on at least one particular user computing device;

wherein the instructions to be executed to:

process one or more values to generate a first representation of one or more particular performance parameters for the particular online digital content to be currently displayed one the at least one particular user computing device;

convert the first representation into a second representation to comprise a change in the one or more particular performance parameters;

detect, from the second representation, the change in the one or more particular performance parameters; and push, at least in part via execution of a publication and/or subscription service of the at least one computing device, particular updated digital content for the particular online digital content to be currently displayed on the at least one particular user computing device to the at least one particular user computing device in substantially real-time at least in part in response to an indication to dynamically update the particular online digital content to be currently displayed on the at least one particular user computing device to be based, at least in part, on the change to be detected in the one or more performance parameters at least in part in accordance with one or more services or customizations, or a combination thereof, specified by a subscription component of the at least one user computing device.

9. The apparatus of claim 8, wherein the indication to dynamically update the particular online digital content to be obtained via an online digital content selection service of the at least one computing device.

10. The apparatus of claim 8, further comprising a communication interface to obtain from at least one online digital content provider computing device the particular updated digital content.

11. The apparatus of claim 10, wherein the instructions to be executed further to validate the particular updated digital content and to push the particular updated digital content to the at least one particular user computing device at least in part in response to a validation of the particular updated digital content.

12. The apparatus of claim 8, wherein the indication to dynamically update the particular online digital content to represent a determination to dynamically update the particular online digital content based at least in part on aggregated or segmented, or a combination thereof, digital online content performance content to be obtained from a plurality of user computing devices.

13. The apparatus of claim 8, wherein the indication to dynamically update the particular online digital content to comprise a specification of the particular updated digital content to be pushed to the at least one particular user computing device.

14. The apparatus of claim 13, wherein the particular updated digital content to comprise updated content for a particular component of the particular digital online content to dynamically change.

15. An apparatus, comprising:
    means for executing computer instructions on at least one computing device without further human interaction in which the at least one computing device includes at least one processor and at least one memory, comprising:
    means for fetching computer instructions from the at least one memory of the at least one computing device for execution on the at least one processor of the at least one computing device;
    means for executing the fetched computer instructions on the at least one processor of the at least one computing device; and
    means for storing in the at least one memory of the at least one computing device any results of having executed the fetched computer instructions on the at least one processor of the at least one computing device;
    wherein the computer instructions to be executed comprise instructions for dynamically updating particular online digital content currently displayed on at least one particular user computing device;
    wherein the means for executing the fetched instructions further comprises:
    means for processing, via the at least one processor of the at least one computing device, one or more values to generate a first representation of one or more particular performance parameters for the particular online digital content currently displayed one the at least one particular user computing device;
    means for converting the first representation into a second representation comprising a change in the one or more particular performance parameters;
    means for detecting, from the second representation, the change in the one or more particular performance parameters; and
    means for pushing the particular updated digital content for the particular online digital content currently displayed on the at least one user computing device to the at least one particular user computing device in substantially real-time at least in part in response to obtaining an indication to dynamically update the particular online digital content currently displayed on the at least one particular user computing device based at least in part on a detected change in the one or more particular performance parameters at least in part in accordance with one or more services or customizations, or a combination thereof, specified by a publication and/or subscription component of the at least one user computing device.

16. The apparatus of claim 15, wherein the means for pushing further comprises means for pushing the particular updated digital content to the at least one particular user computing device at least in part in response to an online digital context service obtaining, at least in part via an online digital selection service of the at least one computing device, the indication to dynamically update the particular online digital content currently displayed on the at least one particular user computing device.

17. The apparatus of claim 15, wherein the means for executing the fetched instructions further comprises means for validating the particular updated digital content and means for pushing the particular updated digital content to the at least one particular user computing device at least in part in response to a validation of the particular updated digital content.

18. The apparatus of claim 15, wherein the indication to dynamically update the particular online digital content represents a determination by an advertiser to dynamically update the particular online digital content based at least in part on aggregated or segmented, or a combination thereof, digital online content performance content obtained from a plurality of user computing devices.

19. The apparatus of claim 15, wherein the indication to dynamically update the particular online digital content comprises a specification of the particular updated digital content to push to the at least one user computing device.

20. The apparatus of claim 19, wherein the particular updated digital content comprises updated content for a dynamically changing component of the particular online digital content.

\* \* \* \* \*